UNITED STATES PATENT OFFICE.

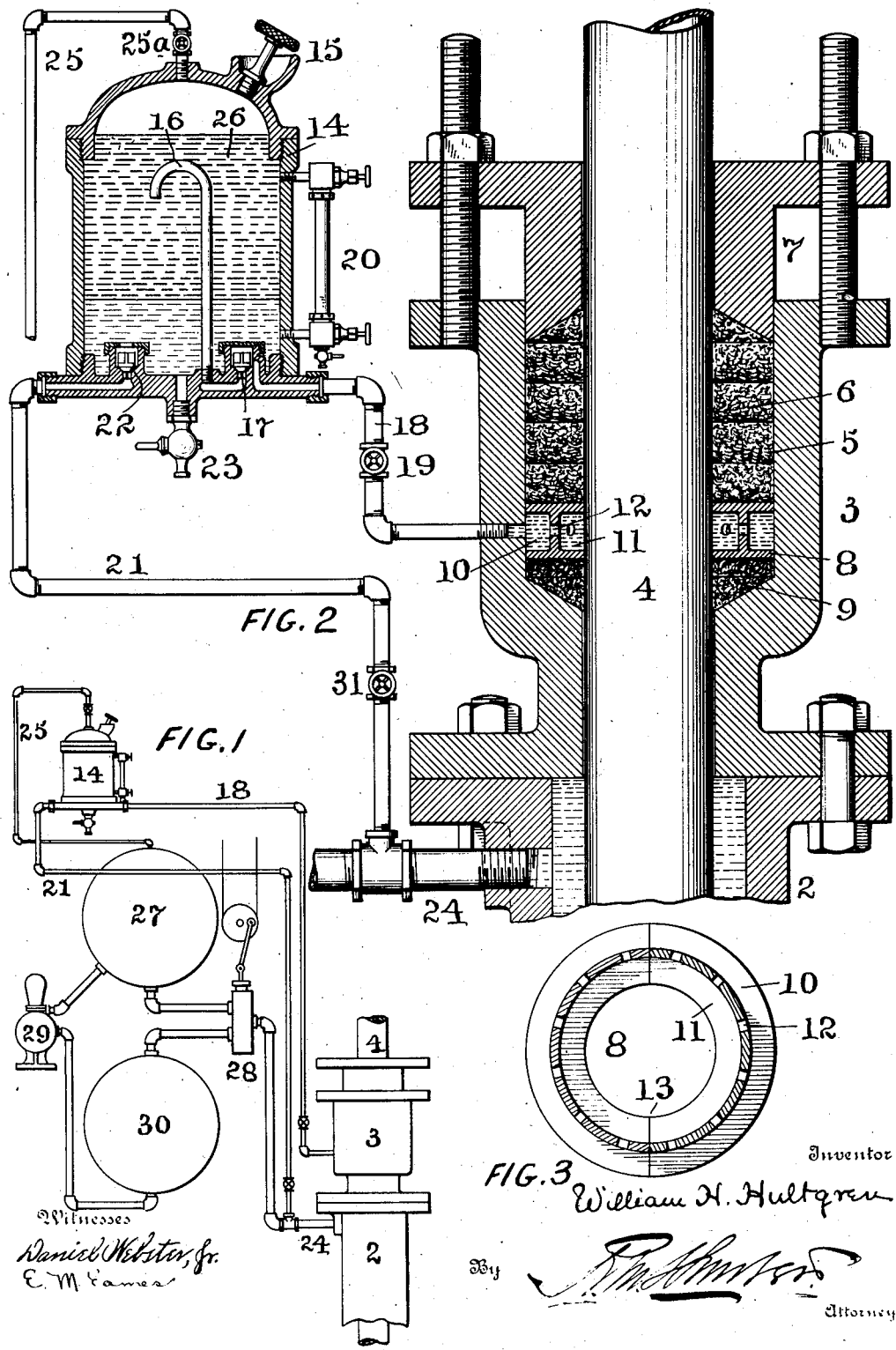

WILLIAM H. HULTGREN, OF PHILADELPHIA, PENNSYLVANIA.

LUBRICATING DEVICE.

1,010,498. Specification of Letters Patent. Patented Dec. 5, 1911.

Application filed June 10, 1908. Serial No. 437,710.

*To all whom it may concern:*

Be it known that I, WILLIAM H. HULTGREN, a citizen of the United States, and resident of the city and county of Philadelphia, State of Pennsylvania, have invented an Improvement in Lubricating Devices, of which the following is a specification.

My invention has reference to lubricating devices and consists of certain improvements which are fully set forth in the following specification and shown in the accompanying drawings which form a part thereof.

The object of my invention is to provide an automatic means for lubricating plungers or piston-rods of cylinders in such a manner that the lubricant will be delivered to the plunger or piston-rod between the main packing of the stuffing box and the interior of the cylinder, whereby the lubricant which may be removed from the plunger or piston-rod during its reciprocation, may find its way to the interior of the cylinder and be caused to adhere to the plunger or piston-rod by the pressure of the fluid within the cylinder.

My invention is more particularly applicable to the lubricating of the plungers of hydraulic elevators now in use, my improvements being capable of application without dismantling the hydraulic cylinder of the elevator apparatus.

My invention consists in providing a cylinder and plunger with automatic means for feeding the lubricant intermittently to the plunger or piston-rod while it is entering the cylinder, the feeding operation being dependent upon an external pressure medium rendered active by variations of pressure within the cylinder.

My invention also consists in combining with the cylinder and its plunger or piston-rod, an automatic oil supplying device comprising an inclosed oil chamber, a discharge pipe leading from the upper part of the chamber and connecting with the cylinder to be lubricated and a pipe connecting the lower part of the chamber with the interior of the cylinder to which the oil is to be delivered, whereby the pressure of the fluid within the cylinder is caused to act upon the lubricant within the chamber to cause it to be put under pressure whereby it is made to flow therefrom to the cylinder; further, in providing the apparatus above specified with an air pipe leading from the top of the chamber and communicating with a source of compressed air whereby a continuous pressure by an elastic medium is exerted upon the upper surface of the oil to insure a steady tendency to flow; further, in providing the stuffing box of the cylinder with a removable ring forming, with the plunger or piston-rod, an annular oil space into which the oil from the lubricant supplying device is delivered, and by which it is brought into contact with the plunger or piston-rod between the main part of the packing and the interior of the cylinder.

My invention also comprehends details of construction which, together with the features above specified will be better understood by reference to the drawings, in which:

Figure 1 is an elevation of a lubricating apparatus applied to a hydraulic elevator and embodying my invention; Fig. 2 is a sectional elevation of the stuffing box portion of the cylinder and plunger of the hydraulic elevator and the lubricating apparatus applied thereto, embodying my invention; and Fig. 3 is a transverse sectional view through the lubricant supply ring.

2 represents a cylinder and may be of any ordinary construction. In a hydraulic elevator this cylinder is usually arranged vertical and is provided at the top with a stuffing box 3 through which the plunger 4 travels. The stuffing box consists of the annular chamber 5 and the usual gland 7 for compressing the packing 6 therein. Arranged in the bottom of the chamber 5 is an annular ring 8. This ring 8 may be formed of brass or other metal and is so shaped as to form an annular oil channel 11 around the plunger or piston-rod. In the preferred form, this ring 8 is made H shaped in cross section so that there is not only an inner annular channel 11, but an outer annular channel 10 also which channels communicate at intervals by apertures 12. Ordinarily, this ring 8 is applied as low down in the stuffing box chamber 5 as possible, leaving only just enough packing below it to form a satisfactory seat, as indicated at 9. This part 9 may, if desired, be solid metal, but as the invention is intended for application to elevators already in use and it would not be known exactly the shape of the bottom of the chamber 5, it is more preferable to employ packing below the ring 8 that will adapt itself to the shape of the bottom of this stuffing box chamber, and upon which the ring 8 may properly seat itself.

The main packing 6 is arranged above or outside of the oil supplying ring 8 so as to keep the oil, as far as possible, within the cylinder during the lubricating action. The oil is supplied to the stuffing box 3 by the pipe 18 which communicates with the outer annular channel 10 of the oil ring 8, and the vertical height of this channel 10 is preferably considerably more than the opening from the pipe 18, so that a reasonable vertical variation in the position of the oil ring within the chamber 5 of the stuffing box may be had without interfering with the oil supply. The oil received in the annular channel 10 passes through the apertures 12 into the inner annular channel 11, and by it is brought in contact with the surface of the plunger or piston-rod 4. As the plunger rises, the packing 6 prevents the oil from escaping above the gland 7, whereas in the downward movement of the plunger or that in the direction within the cylinder the oil may remain more or less upon the surface of the plunger or piston-rod. The small amount of packing 9 below the oil ring will prevent an excessive amount of oil escaping from the oil ring. Furthermore, the pressure of the water within the cylinder 2 will always resist any free escape of the oil from the oil ring.

As it is not convenient to apply a solid ring 8 about the plunger or piston-rod 4 I prefer to divide the ring into two parts, as indicated in Fig. 3, so that they may be placed upon the plunger or piston-rod and dropped down into position within the stuffing box chamber 5, and by which they will be maintained in proper coöperation with the plunger or piston-rod. The construction of this ring may be made in any suitable manner, so long as a channel is provided for supplying the oil to the plunger or piston-rod 4, but I prefer the construction shown as being most excellently adapted to the purposes of my invention.

I will now describe the automatic apparatus for supplying the lubricant to the oil ring 8 by the pipe 18.

14 is an oil chamber, which is made airtight at its upper part and is provided with any suitable means 15 for introducing the supplying of oil 26.

16 is an oil discharge pipe opening into the interior of the chamber 14 near its upper part, and this pipe communicates with the pipe 18 through the check valve 17 which permits the escape of oil from the chamber 14 but prevents a reverse flow. The flow of the oil through the pipe 18 may be controlled by a valve 19 of any suitable construction whereby the rate of supply of oil to the oil ring 8 may be regulated. The lower part of the chamber 14 is connected by a pipe 21 with the water supply pipe 24 connecting with the cylinder 2, and at the entrance of the said pipe 21 into the chamber 14 I provide a check valve 22, which will permit the entrance of the water, but will prevent the flow of either water or oil in a reverse direction.

23 is a drain valve, and 20 is an oil gage to indicate the amount of oil within the chamber 14, the said oil floating upon the water in the lower part of the chamber, and being subjected to a pressure on the top due to the inclosed air.

It will now be understood that when the pressure of the water is supplied to the elevator cylinder 2 it acts through the pipe 21 upon the bottom of the oil 26 and thereby exerts a pressure on the oil which compresses the air above the oil to the same pressure as in the cylinder 2. The compressed air then acts to feed the oil through pipes 16 and 18, to the oil ring 8 when the pressure in the cylinder is reduced by reversing the valve 28. These actions are repeated with each operation of valve 28. When the oil from the chamber 14 is substantially exhausted, namely, when the water level reaches the outlet of the tube 16, then the valve 31 in the pipe 21 is closed, the charging stopper 15 removed, and the drain valve 23 opened until the bottom level of the oil shows near the bottom of the glass gage 20. The drain valve 23 is then closed, and the chamber 14 filled up with oil, and the stopper 15 again inserted. The valve 31 is then opened and the lubricating operation takes place automatically, as before.

By having a chamber 14 sufficiently large, one charge of lubricant may last one or more weeks according to the demand of the plunger 4 for lubricant.

While it is evident that the air above the oil may be put under compression by the admission of the water through the pipe 21, compressed air may be supplied directly to the upper part of the chamber 14 by a pipe 25 leading from the pressure tank 27, which pressure tank is that ordinarily employed for delivering the water through the control valve 28 and pipe 24 to the cylinder 2, as more clearly indicated in Fig. 1. After charging the chamber 14 with compressed air the pipe 25 may be closed by a valve 25$^a$. When the water is discharged from the cylinder 2 through the valve 28 into the receiving tank 30 the pressure in the pipe 21 will fall and check valve 22 close, but the lubricating action then takes place with full effect by reason of the fact that the compressed air above the oil will exert its influence to force the lubricant from the chamber 14 into the oil ring 8 as the plunger moves into the cylinder 2. The water discharged from the cylinder 2 into the receiver 30 is ordinarily pumped by a pump 29 again into the pressure cylinder 27 so that the same water is used over and over again.

When compressed air is not supplied by the pipe 25, the limited amount of air within the chamber 14 above the oil will be sufficient to maintain the pressure on the oil to properly feed the same to the oil ring whenever the pressure in the cylinder 2 is reduced. Where the pipe 25 is not employed, the upper level of the oil would be uncertain, as there will be no pressure above the oil to balance the pressure of the water when admitted below the oil, except so far as the oil rises in the chamber 14 to compress the air. However, by introducing a pressure of air above the oil equal to the pressure of water below the oil from an external source at the start, it is evident that the device may be operated to feed oil until the water level rises to the discharge orifice and practically all of the oil discharged from the chamber 14.

By varying the amount of compressed air above the oil when charging the chamber 14 the quantity of oil fed to the plunger with each reversal of the valve 28 may be regulated, because the smaller the quantity of air allowed to be present in the chamber 14, the less will be the quantity of flow before equilibrium will be established and flow stopped. There would be no feeding of lubricant if the elevator was at rest or out of use. The device only feeds oil when the plunger is operating.

Because of the accuracy and uniformity of the operation of this device and of the fact that there is no leakage of water which carries off the oil as takes place in the ordinary method of lubrication, there is great saving effected in the consumption of the lubricating material. Moreover, as the actual supply of the lubricant may be under perfect control by means of the valve 19, a minimum amount of lubricant may be employed, and consequently secure the best results from the least consumption of said lubricant. As the feeding of the oil is intermittent and only momentary after the valve 28 has reduced the pressure in cylinder 2, it is evident that the oil is fed only when the plunger is entering the cylinder and is stopped when the plunger remains at rest or when the elevator is not running. Where the plunger is reasonably smooth and of uniform diameter, it can, by my improvements, be maintained indefinitely in perfect working condition, all objectionable leakage prevented, and less care required on the part of the engineer to maintain perfect conditions. It is also evident that as the packing performs its duty in a more perfect manner when lubricated by my improvements, there will also be a saving effected in the amount of water required for operating the apparatus.

My improved lubricator may be located in any convenient position adjacent to the elevator hatchway, thereby eliminating the necessity of interrupting the elevator service and incurring the danger incident to entering the elevator pit for the purpose of lubricating the plunger. The objectionable work of slushing the plunger by hand with grease, which is now necessary, is also avoided.

I have shown my apparatus in a form which is especially adapted for elevator work, but I do not restrict myself to any particular use of my invention or to whether the cylinder 2 is operated by water, steam or other fluid, as the same general principle may be employed in other uses to which my invention may be applied, as will readily appear to those skilled in engineering work, involving the use of cylinders and piston-rods or plungers. Therefore, while I prefer the construction shown, the details thereof may be modified in various ways without departing from the spirit of the invention.

Having now described my invention what I claim as new and desire to secure by Letters Patent is:

1. A cylinder having a stuffing box combined with an oil ring having an oil passage on its inner part said oil ring being arranged near the inner end of the stuffing box, packing arranged upon the oil ring and between it and the outer part of the stuffing box, a gland for putting the packing under compression upon the oil ring, a pipe for supplying oil to the oil ring through the stuffing box, and automatic means for supplying oil to the oil pipe consisting of a closed chamber in which the oil is placed, an opening from said chamber for supplying oil to the oil pipe, a pipe forming a communication between the interior of the cylinder and the lower part of the chamber, and means for supplying compressed air from an external source to the upper part of the chamber above the oil.

2. An automatic lubricating device consisting of a closed chamber, an oil discharge passage from the oil space in the chamber provided with a check valve, a pressure supply pipe communicating with the lower part of the chamber and also provided with a check valve, a drain valve at the bottom of the chamber, and a compressed air pipe communicating with the chamber for supplying compressed air from an outside source to the upper portion thereof.

In testimony of which invention, I have hereunto set my hand.

WM. H. HULTGREN.

Witnesses:
R. M. HUNTER,
R. M. KELLY.